United States Patent
Dreyer et al.

(10) Patent No.: US 12,513,399 B2
(45) Date of Patent: Dec. 30, 2025

(54) METHOD FOR CHANGING A TOTAL MAGNIFICATION OF AN OPTICAL OBSERVATION APPARATUS, CONTROL DEVICE FOR AN OPTICAL OBSERVATION APPARATUS, AND OPTICAL OBSERVATION APPARATUS

(71) Applicant: CARL ZEISS MEDITEC AG, Jena (DE)

(72) Inventors: Stephan Dreyer, Aalen (DE); Thomas Lang, Oberhaching (DE)

(73) Assignee: CARL ZEISS MEDITEC AG, Jena (DE)

( * ) Notice: Subject to any disclaimer, the term of this patent is extended or adjusted under 35 U.S.C. 154(b) by 0 days.

(21) Appl. No.: 18/408,071

(22) Filed: Jan. 9, 2024

(65) Prior Publication Data

US 2024/0244327 A1 Jul. 18, 2024

(30) Foreign Application Priority Data

Jan. 12, 2023 (DE) .................... 10 2023 100 645.2

(51) Int. Cl.
*H04N 23/69* (2023.01)
*G02B 21/00* (2006.01)
(Continued)

(52) U.S. Cl.
CPC ......... *H04N 23/69* (2023.01); *G02B 21/0012* (2013.01); *G02B 21/365* (2013.01); *H04N 5/2628* (2013.01); *H04N 5/91* (2013.01)

(58) Field of Classification Search
CPC ........ H04N 23/69; H04N 5/2628; H04N 5/91; G02B 21/0012; G02B 21/365
See application file for complete search history.

(56) References Cited

U.S. PATENT DOCUMENTS 1,272,098 A * 7/1918 Reily .................. A43C 15/161
36/59 R
11,058,513 B2 7/2021 Ramirez Luna et al.
(Continued)

FOREIGN PATENT DOCUMENTS

CN 101257579 A 9/2008
DE 102009012707 A1 9/2010
(Continued)

OTHER PUBLICATIONS

German Office Action for Application No. 10 2023 100 645.2, mailed Jan. 12, 2023 (13 pages).

*Primary Examiner* — Mekonnen D Dagnew
(74) *Attorney, Agent, or Firm* — NIXON PEABODY LLP; Jeffrey L. Costellia

(57) ABSTRACT

A method, a control device for carrying out the method, and an optical observation apparatus having the control device are provided. The optical observation apparatus comprises an imaging optical unit for generating at least one optical image of the observation object, at least one optical magnification changer for providing an optical magnification of the at least one optical image, at least one digital image sensor for recording at least one digital image of the at least one optical image, at least one digital zoom system for providing a digital magnification of the at least one digital image, and an adjustable magnification range for the total magnification.

18 Claims, 5 Drawing Sheets

(51) Int. Cl.
*G02B 21/36* (2006.01)
*H04N 5/262* (2006.01)
*H04N 5/91* (2006.01)

(56) References Cited

U.S. PATENT DOCUMENTS

| | | | |
|---|---|---|---|
| 11,734,936 B2* | 8/2023 | Honegger | H04N 7/183 |
| | | | 382/103 |
| 2012/0002274 A1 | 1/2012 | Knoblich et al. | |
| 2012/0099004 A1* | 4/2012 | Shibuno | H04N 23/69 |
| | | | 348/E5.051 |
| 2014/0253761 A1 | 9/2014 | Okada et al. | |
| 2018/0136450 A1 | 5/2018 | Regensburger | |
| 2018/0250092 A1 | 9/2018 | Saijo | |
| 2018/0338813 A1 | 11/2018 | Taguchi | |
| 2019/0339502 A1* | 11/2019 | Regensburger | G06T 7/593 |
| 2021/0231941 A1 | 7/2021 | Regensburger et al. | |

FOREIGN PATENT DOCUMENTS

| | | |
|---|---|---|
| DE | 102011103395 A1 | 11/2012 |
| DE | 102016122004 A1 | 5/2018 |
| DE | 102018110641 B3 | 7/2019 |
| DE | 102018104704 A1 | 9/2019 |
| DE | 102020101880 A1 | 7/2021 |
| JP | 2013007849 A | 1/2013 |

\* cited by examiner

METHOD FOR CHANGING A TOTAL MAGNIFICATION OF AN OPTICAL OBSERVATION APPARATUS, CONTROL DEVICE FOR AN OPTICAL OBSERVATION APPARATUS, AND OPTICAL OBSERVATION APPARATUS

CROSS-REFERENCE TO RELATED APPLICATIONS

The present application claims priority under 35 U.S.C. § 119 to German Patent Application No. 10 2023 100 645.2, filed Jan. 12, 2023, the contents of which are incorporated by reference herein in their entirety.

The present description relates to methods for changing a total magnification of an observation object imaged with the aid of an optical observation apparatus, said total magnification being given by an optical magnification and a digital magnification. In addition, the present description relates to a control device for an optical observation apparatus, and to an optical observation apparatus.

In the field of optical observation apparatuses, in particular in the field of surgical microscopes, there is an increasing transition from purely optical apparatuses, in which an optical image generated from the observation object or optical images generated from the observation object in the case of stereoscopic partial images, for example, is or are viewed solely by way of an optical examination, to purely digital apparatuses, in which the generated optical image or the generated images is or are recorded by means of at least one optical image sensor and represented as a digital image or digital images on a display, or hybrid apparatuses, which have not only an optical examination for viewing the at least one optical image but also at least one display for representing the at least one digital image. Even purely optical apparatuses such as purely optical surgical microscopes, for example, often have a magnification changer such as, for instance, a so-called Galilean changer or a zoom system and hence offer a wide range of magnifications. In purely digital or hybrid apparatuses, the purely optical magnification changer is often also supplemented by a digital zoom system that enables a further increase in the magnification in addition to the purely optical magnification.

Surgical microscopes that also have a digital zoom system in addition to an optical zoom system are described for example in U.S. Pat. No. 11,058,513 B2 and CN 101257579 A. The optical zoom system in CN 101257579 A has a number of discrete positions having discrete magnification steps. Between the discrete magnification steps of the optical zoom system, intermediate magnifications are generated with the aid of the digital zoom system.

DE 10 2016 122 004 A1 discloses a surgical microscope which carries out a change in the magnification by means of an optical zoom followed by a change in the magnification by means of a digital zoom. For this purpose, first the limit value of the magnification is determined and then an optical zoom factor of the image recording unit is increased iteratively until its maximum value is reached. Subsequently, a digital zoom factor is additionally activated and is increased iteratively until the image reproduced on the display unit is represented with a total magnification that corresponds to the limit value of the magnification.

DE 10 2020 101 880 A1 describes a microscopy method which effects an adjustment/closed-loop control of a parameter by virtue of a desired total imaging scale being defined at a control device. The total imaging scale is then divided between an optical imaging scale serving as manipulated variable by way of an appropriate adjustment of a zoom optical unit and a digital post-magnification such that the parameter lies in a predetermined setpoint value range or misses the latter by no more than a tolerance.

JP 2013007849 A describes a microscope in which a user specifies a magnification represented on the display and also a depth of field via an input unit. An adjusting unit then calculates the imaging magnification of the optical system on the basis of the input depth of field. A digital magnification is calculated on the basis of the input display magnification by means of an image processing unit. As a result, the observation object can be viewed by means of the desired display magnification, while at the same time the desired depth of field can be ensured without using the aperture stop.

Combinations of optical magnification changers and digital zoom systems are also used in cameras. By way of example, DE 10 2011 103 395 A1 describes a camera in which one image property of the images supplied by the camera system is determined coarsely by a discrete magnification changer (Galilean changer) and finely by digital zoom according to the user's specifications. Said one image property may be the magnification, the image size or image segment, for example.

A change in the magnification also influences further imaging variables such as, for example, the field of view of the imaging and the depth of field of the imaged object. The depth of field is of great importance particularly in surgical microscopes. In this regard, in ophthalmic surgery, for example, interventions on the anterior and posterior chambers of the eye are carried out with the aid of surgical microscopes. In this case, a large depth of field is generally desired by the surgeons in order that the surgical microscope does not have to be refocused too often during the intervention. In the case of purely optical surgical microscopes, a degree of compensation can also take place owing to the accommodation ability of the surgeon's eye. This possibility of compensation is absent in hybrid or purely digital apparatuses since the image of the operating area is represented on a display and so the entire representation takes place at a single distance from the eye. In addition, optical observation apparatuses such as surgical microscopes, in particular, often demand a high detail resolution capability, for example in the case of an ophthalmological intervention for puncturing vessels or during work on other extremely small ocular structures.

Although a depth of field and a magnification of the display representation can be specified in JP 2013007849 A, this type of adjustment is comparatively complex since the values for the depth of field and the magnification of the display representation first have to be input, which necessitates the user knowing a value for the depth of field and the magnification in advance. During an operation, however, the surgeon wants to be able to adjust the magnification intuitively, without previously having to think about how the depth of field must be adjusted for a specific magnification of the object represented on the display.

It is a first object of the present invention to provide an advantageous method for changing a total magnification of an optical observation apparatus over a magnification range, the optical observation apparatus comprising at least one optical magnification changer, at least one digital image sensor, and at least one digital zoom system.

Moreover, it is a second object of the present invention to provide an advantageous magnification control device.

A third object of the present invention is to provide an advantageous optical observation apparatus.

In accordance with a first aspect of the invention, a method for changing the total magnification of the representation of an observation object imaged with the aid of an optical observation apparatus is provided. The optical observation apparatus used has an imaging optical unit for generating at least one optical image of the observation object, at least one optical magnification changer for providing an optical magnification of the at least one optical image, at least one digital image sensor for recording at least one digital image of the at least one optical image, at least one digital zoom system for providing a digital magnification of the at least one digital image, and an adjustable magnification range for the total magnification. In this case, the total magnification of the optical observation apparatus is given by the optical magnification and the digital magnification.

The optical magnification changer can be a zoom system for continuously variably adjusting the optical magnification, or a so-called Galilean changer. While it is possible only to change between different fixed magnification factors of the optical image in a Galilean changer, the magnification factor of the optical image can be varied in a continuously variable manner in a zoom system. For this purpose, a zoom system is constructed e.g. from a lens combination having three lenses, the two object-side lenses being able to be displaced in order to vary the magnification factor in a continuously variable manner. In actual fact, however, a zoom system can also have more than three lenses, for example four or more lenses, in which case the outer lenses can then also be arranged in a fixed manner. In a Galilean changer, by contrast, there are a plurality of fixed lens combinations which represent different magnification factors and which can be introduced into the beam path in alternation.

In the case of a digital zoom system, the magnification is changed by virtue of a segment of the digital image recorded by the image sensor being scaled to the entire image format of the display and being represented on a display. This can be done for example by the segment of the digital image recorded by the image sensor being scaled to the entire image format of the image sensor and then being processed further by the representation chain until the representation on the display takes place at the end of the representation chain. Alternatively, the segment of the digital image recorded by the image sensor can be scaled directly to the image format of the display. The representation chain typically comprises at least the image sensor that records the digital images, and the associated readout electronics, a unit that controls the graphical output on a display, and a display on which the digital images recorded by the image sensor are represented. In this case, the image sensor and the display can have the same or different resolutions, the unit that controls the graphical output on a display performing the adaptation of the resolution of the digital image recorded with the resolution of the image sensor or of the segment of the digital image that is used for the digital magnification to the resolution of the display. The unit that controls the graphical output on a display can be the camera control unit (CCU) of the camera that records the image, a graphics card, sometimes also called video adapter, or any other hardware or software unit suitable for controlling the graphical output.

The size of the segment of the digital image that is used for the digital magnification can be changed quasi-continuously. Quasi-continuously because the size of the segment of the digital image recorded by the image sensor is changed each time by at least one pixel line and/or at least one pixel column of the image. It is often the case, however, that the digital magnification range provided by the digital zoom system can be varied only in steps. By way of example, in a digital magnification range with magnification factors in the range of 1.0 to 3.0, the magnification factor can be changed in steps of 0.1 or 0.2.

The total magnification is given by the combination of the optical magnification attained with the optical magnification changer and the digital magnification attained with the digital zoom system.

In the method according to the invention, at least the optical magnification of the at least one optical image or at least the digital magnification of the at least one digital image is changed for the purpose of changing the total magnification. The method according to the invention is distinguished here by the fact that in a first portion of the magnification range, comprising the lowest total magnifications, at least 65%, in particular at least 75%, preferably at least 90% and ideally 100%, of the change in the total magnification is brought about by adjusting the digital magnification, and in a second portion of the magnification range, following the first portion of the magnification range, at least 65%, in particular at least 75% and preferably at least 90% and ideally 100%, of a change in the total magnification is brought about by adjusting the optical magnification. The lowest total magnifications shall be considered to be magnifications which amount to not more than approximately 35% of the maximum possible total magnification, in particular not more than 20% of the maximum possible total magnification, and more particularly not more than 12.5% of the maximum possible total magnification, where the maximum possible total magnification is given by the maximum possible optical magnification with at the same time the maximum possible digital magnification.

By virtue of the total magnification in the first portion of the magnification range being based primarily on the digital magnification of the at least one digital image, the change in the magnification can take place with the depth of field of the at least one optical image being substantially unchanged. By contrast, if the magnification were based primarily on the optical magnification of the at least one optical image, the change in the magnification would also be associated with a change in the depth of field of the at least optical image—and thus also of the at least one digital image obtained from the at least one optical image by means of the at least one image sensor. The reason for this is that a change in the optical magnification with the aid of the magnification changer also entails a change in the numerical aperture of the optical observation apparatus. The greater the optical magnification, the greater, too, the numerical aperture of the optical observation apparatus. However, the depth of field decreases further and further as the numerical aperture becomes greater, and so increasing the total magnification with the aid of the magnification changer, i.e. on the basis of the optical magnification, would lead to a loss of depth of field. This loss of depth of field could be compensated for by reducing an aperture. However, this would result in a loss in respect of the resolution capability of the optical observation apparatus. Changing the total magnification in the first portion of the magnification range primarily on the basis of a change in the digital magnification therefore allows the total magnification to be increased both without having a significant adverse effect on the depth of field and without having a significant adverse effect on the resolution. It is particularly advantageous, however, if the change in the total magnification in the first portion of the magnification range is brought about exclusively by adjusting the digital magnification. In this case, the depth of field attained with the optical observation apparatus and the resolution attained with the optical observation apparatus remain unchanged in the course of the change in the total magnification. The lower the optical magnification in the first portion of the magnification range, the greater the depth of field. If a large depth of field is desired, it is therefore advantageous if in the first portion of the magnification range, the optical magnification is kept constant at a low value, in particular the lowest adjustable value. However, even if in the first portion of the magnification range, a small part of the change in the total magnification (not more than 35%, in particular not more than 25% and preferably not more than 10%) takes place on the basis of a change in the optical magnification and the rest takes place on the basis of a change in the digital magnification, the effects on the depth of field and the resolution are small in comparison with a corresponding change in the total magnification that takes place exclusively on the basis of the optical magnification.

In comparison with the method described in JP 2013007849 A, moreover, the adjustment of the total magnification can take place comparatively simply and intuitively with the method according to the invention, since it is not necessary first to input the values for the depth of field and the magnification of the display representation which are taken as a basis for calculating the division of the total magnification between the optical magnification and the digital magnification. In the method according to the invention, the adjustment of the total magnification can take place as usual on the basis of the actuation of an operating element which is customary for the adjustment of the magnification and which enables the total magnification to be increased or decreased.

In the second portion of the magnification range, at least 65%, in particular at least 75%, preferably at least 90% and ideally 100%, of a further increase in the total magnification can then be effected by adjusting the optical magnification, the depth of field in this portion then being greater than it would be if the total magnification had already been attained with the optical magnification in the first portion. In comparison with the prior art, in which for the purpose of adjusting the total magnification, firstly an optical magnification takes place and a digital magnification takes place only when the optical magnification has been exhausted, a larger depth of field is therefore present in the first two portions in conjunction with the same total magnifications as in the prior art.

In the first portion of the magnification range, at least 65%, in particular at least 75%, preferably at least 90% and ideally 100%, of the change in the total magnification up to an upper limit of the total magnification of the first portion of the magnification range can be brought about by adjusting the digital magnification. In this case, the upper limit of the total magnification of the first portion of the magnification range is preferably defined by that digital magnification which, together with the optical magnification employed in the first portion of the magnification range, leads to a total magnification for which a user with an average eye just about perceives no noticeable loss of resolution in the magnified image represented on the display at the end of the representation chain. In other words, in the first portion of the magnification range, for the purpose of digitally magnifying the digital image, the segment of the digital image that is used for digital magnification can be reduced in size as long as a user with an average eye still perceives no noticeable loss of resolution in the segment of the digital image that is represented on the display at the end of the representation chain with the entire display area being utilized. In the context of the present invention, the smallest segment of the digital image recorded by the image sensor for which a user with an average eye still perceives no noticeable loss of resolution shall be considered to be that segment for which the size of the smallest structures represented in the segment of the digital image, in the digitally magnified image, just correspond to the resolving power of the average eye. If the segment were chosen to be even smaller than that, moreover, the smallest structures represented in the segment of the digital image, in the magnified image represented on the display, would be blown up to such an extent that they would be represented larger than necessary for the resolving power of the eye, with the result that the resolving power of the eye is no longer fully utilized. The size of the structures that just corresponds to the resolving power of the average eye depends on the optical magnification employed in the first portion of the magnification range and on the optical resolution attained therewith in the optically magnified image, on the resolution of the image sensor that converts the optically magnified image into the digital image, on the resolution of the display on which the digitally magnified digital image is displayed, and on the provided viewing distance between the user and the display. The values for the parameters mentioned can be taken as a basis for calculating or ascertaining in some other way how small the image segment—represented from the digitally magnified image—of the original, not digitally magnified, image is permitted to be before a user with an average eye as yet perceives no noticeable loss of resolution in the magnified image.

The lower limit of the total magnification of the second portion of the magnification range can then be formed by the upper limit of the total magnification of the first portion of the magnification range. Furthermore, the upper limit of the total magnification of the second portion of the magnification range can be defined by the highest optical magnification provided by the magnification changer and the digital magnification present at the upper limit of the total magnification of the first portion of the magnification range. In general, in the second portion of the magnification range, the digital magnification is thus kept constant at a medium value. Alternatively, the digital magnification in the second portion of the magnification range can also vary in a range of medium values as long as at least 65%, in particular at least 75%, preferably at least 90% and ideally 100%, of the total magnifications in the second portion of the magnification range is brought about by adjusting the optical magnification.

The lower limit of the total magnification in the first portion of the magnification range is preferably given by the lowest adjustable optical magnification and the lowest adjustable digital magnification.

In one development of the method according to the invention, the entire magnification range can be divided into at least the first portion, the second portion and at least one optional third portion, following the second portion. In the third portion of the magnification range, at least 65%, in particular at least 75%, preferably at least 90% and ideally 100%, of the change in the total magnification is brought about by adjusting the digital magnification. This makes it possible to configure the second and third portions in accordance with the prior art, in which firstly an optical magnification takes place and a digital magnification takes place only when the optical magnification has been exhausted, with the difference that on account of the digital magnification that additionally comes from the first portion of the magnification range and is preferably constant in the second portion, the total magnification in the second range is higher than if the total magnification were provided solely by the optical magnification. As a result, for a given total magnification, that depth of field in the second portion of the magnification range which is determined by the optical magnification that is smaller than the total magnification is larger than if the total magnification were attained solely or predominantly by way of the optical magnification. The third portion then affords the possibility, if necessary, of further increasing the total magnification while accepting losses. In this case, the losses concern a loss of depth of field and/or a loss of resolution. A loss of depth of field can be compensated for by reducing the aperture of an aperture stop, but that is possible only to the detriment of the resolution. Particularly with regard to the third portion, it is therefore advantageous if a component for depth of field adjustment, for instance an aperture stop having an adjustable aperture, is present, such that a user can adjust a combination of depth of field and resolution that is acceptable to the user.

In the third portion of the magnification range, the optical magnification can preferably be kept constant at a high value, in particular at the highest value adjustable at the magnification changer.

In this development of the method according to the invention, by way of example,
- in the first portion of the magnification range, the digital magnification in conjunction with a low optical magnification, in particular the lowest optical magnification adjustable at the magnification changer, can be varied in a range from a low digital magnification, in particular the lowest digital magnification adjustable at the digital zoom system, up to a medium digital magnification,
- in the second portion of the magnification range, the optical magnification in conjunction with the medium digital magnification of the first portion of the magnification range, can be varied in a range from a low optical magnification, in particular the lowest optical magnification adjustable at the magnification changer, up to a high optical magnification, in particular the highest optical magnification adjustable at the magnification changer, and
- in the third portion of the magnification range, the digital magnification in conjunction with the high optical magnification of the second portion of the magnification range, can be varied in a range from the medium digital magnification of the first portion of the magnification range up to a high digital magnification, in particular the highest digital magnification adjustable at the digital zoom system.

The depths of field and resolutions available in the individual portions of the magnification range can be influenced by defining the low optical magnification used, the medium digital magnification used and the high optical magnification used.

In the described development of the method according to the invention, the lower limit of the total magnification of the third portion of the magnification range can be formed by the upper limit of the total magnification of the second portion of the magnification range. If, moreover, the lower limit of the total magnification of the second portion of the magnification range is formed by the upper limit of the total magnification of the first portion of the magnification range, a continuous transition between the portions of the magnification range can be realized and a continuous change in the total magnification can thus be made possible.

If, moreover, the lower limit of the total magnification in the first portion of the magnification range is given by the lowest optical magnification adjustable at the magnification changer and the lowest digital magnification adjustable at the digital zoom system, and the upper limit of the total magnification of the third portion of the magnification range is given by the highest optical magnification adjustable at the magnification changer and the highest digital magnification adjustable at the digital zoom system, a continuous change in the total magnification from the lowest possible total magnification up to the highest possible total magnification can be made possible. In this case, in the first portion of the magnification range, the optical magnification can be adjusted in constant fashion to the lowest optical magnification adjustable at the magnification changer. Furthermore, the digital magnification in the second portion of the magnification range can be adjusted in constant fashion to that digital magnification which, in conjunction with the lowest optical magnification adjustable at the magnification changer, leads to a total magnification for which a user with an average eye just about perceives no noticeable subjective loss of resolution in the magnified image. Furthermore, in the third portion of the magnification range, the optical magnification can be adjusted in constant fashion to the highest optical magnification adjustable at the magnification changer. In this way, it is possible to achieve a total magnification with high resolution and a high depth of field in the first two portions. It is only in the third portion of the magnification range, i.e. only at the highest total magnifications, that noticeable losses in the depth of field and/or the resolution then occur.

In another advantageous development of the method according to the invention, the total magnification is increased or decreased continuously, quasi-continuously or in steps, in particular in uniform steps, upon actuation of an operating element. As a result, the total magnification can be changed by means of intuitive operation such as is known to a user e.g. from operating a purely optical zoom system. In this case, the total magnification can also be increased or decreased across the portions of the magnification range, such that magnifications can be adjusted in the entire magnification range by way of intuitive operation.

In a further advantageous development of the method according to the invention, the optical observation apparatus comprises a component for depth of field adjustment such as e.g. an iris stop or a changing device for alternately introducing stops having different apertures into the beam path of the optical observation apparatus. Optionally, the component for depth of field adjustment is adjusted at least in one of the portions of the magnification range. The depth of field can thus be optimized for the optical magnification chosen in each case.

In the method according to the invention, an image recorded by the at least one digital image sensor can be represented by means of at least one display. In this case, it can happen that only some of the pixels present on the display are used on the at least one display for the purpose of representing an image recorded by the at least one digital image sensor, the number of pixels used on the display for the purpose of representing an image recorded by the at least one digital image sensor being lower than the number of pixels present on the digital image sensor for the purpose of recording a digital image. In this regard, for example, when stereoscopic images are represented by means of a single display, it is not unusual to represent the left and right stereoscopic images with differently polarized light in each case only in every second line of the display, the lines for the left partial image and the right partial image alternating with one another. The stereoscopic partial images are then viewed on the display by means of polarization spectacles, in which the left and right spectacle lenses each only allow light with the corresponding polarization to pass through. In this case, only half of the lines available on the display for the representation of an image, and thus only half of the pixels available for the representation of an image, are used for the representation of each stereoscopic partial image. As an alternative to the left and right partial images being represented only in every second line, the left partial image and the right partial image can also be represented only in every second column or with any other suitable division of the pixels of the display.

If only some of the pixels present on the display are used on the at least one display for the purpose of representing an image recorded by the at least one digital image sensor, it is advantageous if the digital image is digitally magnified in the first portion of the magnification range, in particular at the upper limit of the total magnification thereof, at most to an extent such that the number of pixels of the at least one image sensor which record the image segment corresponding to the digitally magnified image does not fall below the number of those pixels which are used in the at least one display for the purpose of representing an image recorded by the at least one digital image sensor. In the case of a greater magnification, additional pixels would have to be generated by interpolation, for example, for the representation of the digitally magnified image, which would lead to a loss of resolution. However, a slight loss of resolution by e.g. up to 20%, in particular by up to 10% or by up to 5%, may be unproblematic provided that the viewer of the digitally magnified image cannot perceive this actual loss of resolution, e.g. owing to the distance between the observer and the display being too high, or owing to limited optical quality of the observation object itself. By way of example, in ophthalmology, clouding of the cornea or a cataract may limit the perceptible resolution when viewing the lens or the retina of the human eye, such that the viewer does not perceive a slight actual loss of resolution as a result of even greater digital magnification, but can indeed use the resultant increased depth of field. In this case, the digital image can be digitally magnified in particular at the upper limit of the first portion of the magnification range to an extent such that the number of pixels of the at least one image sensor which record the image segment corresponding to the digitally magnified image falls below the number of those pixels which are used in the at least one display for the purpose of representing an image recorded by the at least one digital image sensor by up to 5%, up to 10% or even up to 20%. In this case, the acceptable loss of resolution depends on the conditions during viewing and the optical quality of the observation object.

Additionally or alternatively, the case may also occur in which the at least one display, for the purpose of representing the image recorded by the at least one digital image sensor, contains fewer pixels than the number of pixels available to the at least one digital image sensor for the purpose of recording the digital image. By way of example, it can happen that displays having fewer pixels than the image sensor used for image recording or the image sensors used for image recording are installed in a digital examination or smartglasses. In this case, it is advantageous if the digital image is digitally magnified in the first portion of the magnification range, in particular at the upper limit of the total magnification thereof, at most to an extent such that the number of pixels of the at least one image sensor which record the image segment corresponding to the digitally magnified image does not fall below the number of pixels of the at least one display which are present for the purpose of representing an image recorded by the at least one digital image sensor. In the case of a greater magnification, additional pixels would have to be generated by interpolation, for example, for the representation of the digitally magnified image, which would lead to a loss of resolution. However, a slight loss of resolution by e.g. 20%, in particular by 10% or by up to 5%, may be unproblematic in this case provided that the viewer of the digitally magnified image cannot perceive this actual loss of resolution, e.g. owing to the distance between the observer and the display being too high, or owing to limited optical quality of the observation object itself, as has been described above on the basis of the example of viewing the lens or the retina of the human eye. In this case, the digital image can be digitally magnified in particular at the upper limit of the first portion of the magnification range to an extent such that the number of pixels of the at least one image sensor which record the image segment corresponding to the digitally magnified image falls below the number of the pixels of the at least one display which are present for the purpose of representing an image recorded by the at least one digital image sensor by up to 5%, up to 10% or even up to 20%. In this case, the acceptable loss of resolution depends on the conditions during viewing and the optical quality of the observation object.

In the context of the considerations above, defective pixels shall be considered to be pixels present, even if those cannot be used. Defective pixels that would be used if they were not defective shall likewise be considered to be used pixels in the considerations above.

In accordance with a second aspect of the invention, provision is made of a control device for an optical observation apparatus comprising an imaging optical unit for generating at least one optical image of an observation object, at least one optical magnification changer for providing an optical magnification of the at least one optical image, at least one digital image sensor for recording at least one digital image of the at least one optical image, at least one digital zoom system for providing a digital magnification of the at least one digital image, and an adjustable magnification range for the total magnification. In this case, the total magnification is given by the optical magnification and the digital magnification. The control device according to the invention comprises a divider and a magnification controller, the divider being designed to divide the magnification range for the total magnification into portions, and the magnification controller being designed to carry out the method according to the invention for changing the total magnification of the representation of an observation object imaged with the aid of an optical observation apparatus.

With the control device according to the invention, the method according to the invention for changing the total magnification of the representation of an observation object imaged with the aid of an optical observation apparatus can be carried out and the advantages described with reference to this method can thus be realized. In developments of the control device according to the invention, the magnification controller can be designed to carry out the described developments of the method according to the invention.

In accordance with a third aspect of the invention, provision is made of an optical observation apparatus, the optical observation apparatus comprising an imaging optical unit for generating at least one optical image of the observation object, at least one optical magnification changer for providing an optical magnification of the at least one optical image, at least one digital image sensor for recording at least one digital image of the at least one optical image, at least one digital zoom system for providing a digital magnification of the at least one digital image, and an adjustable magnification range for the total magnification. In this case, the total magnification of the optical observation apparatus is given by the optical magnification and the digital magnification. Moreover, the optical observation apparatus according to the invention has a control device according to the invention. The optical observation apparatus according to the invention makes it possible to change the total magnification by means of the method according to the invention for changing the total magnification of the representation of an observation object imaged with the aid of an optical observation apparatus, or by means of one of the described developments of the method according to the invention.

The optical observation apparatus according to the invention can additionally contain an operating element for increasing or decreasing the magnification, the actuation of which causes the magnification controller to increase or decrease the total magnification continuously, quasi-continuously or in steps, in particular in uniform steps, even if a change from one portion of the magnification range to another portion of the magnification range takes place in the course of increasing or decreasing the total magnification. In the optical observation apparatus configured in this way, the magnification can be changed by means of intuitive operation such as is known to a user from operating a purely optical zoom system.

Moreover, the optical observation apparatus according to the invention can contain a component for depth of field adjustment, e.g. an iris stop or a changing device for alternately introducing stops having different apertures into the beam path of the optical observation apparatus. The control device then has a depth of field controller configured also to perform an adjustment of the component for depth of field adjustment during an adjustment of the magnification at least in one of the magnification range portions. The depth of field can thus be optimized for the optical magnification chosen in each case.

For the purpose of viewing the digital image, the optical observation apparatus can comprise at least one display, the at least one digital image sensor having a higher resolution than the at least one display. As a result, the digital image can be digitally magnified without subjective loss of resolution for the user until the number of pixels of the at least one image sensor which records the image segment corresponding to the digitally magnified image corresponds to the number of pixels of the at least one display.

Further features, properties and advantages of the invention will become apparent from the following description of exemplary embodiments with reference to the accompanying figures.

Figure 4:
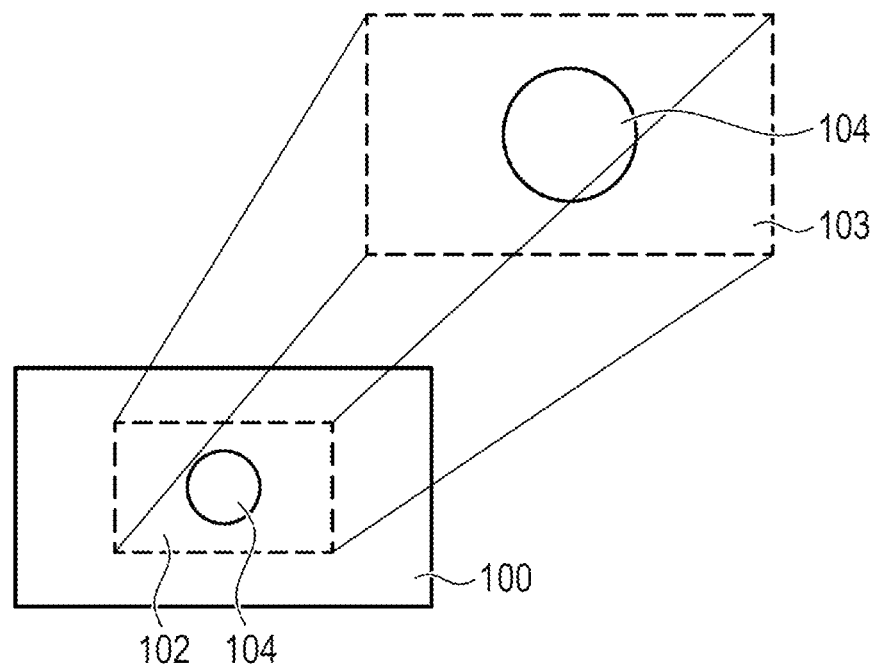

FIG. 4 schematically shows a digital magnification of an image segment.

Figure 5:
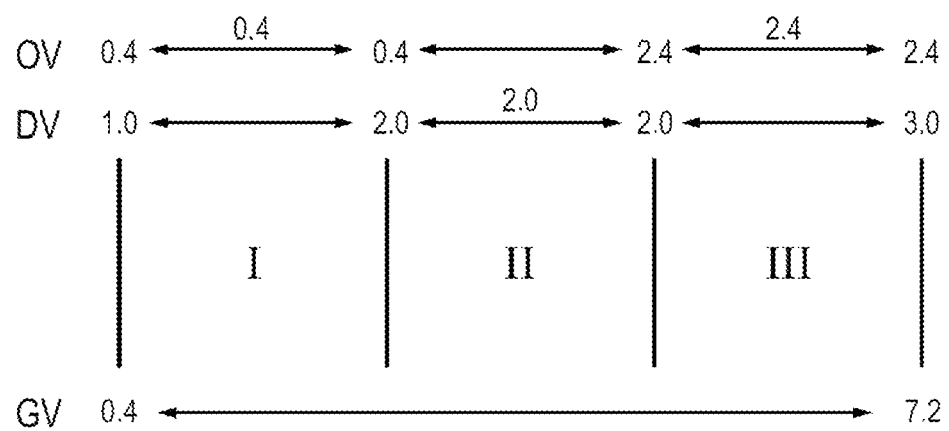

FIG. 5 schematically shows the division of the magnification range into portions.

Figure 6:
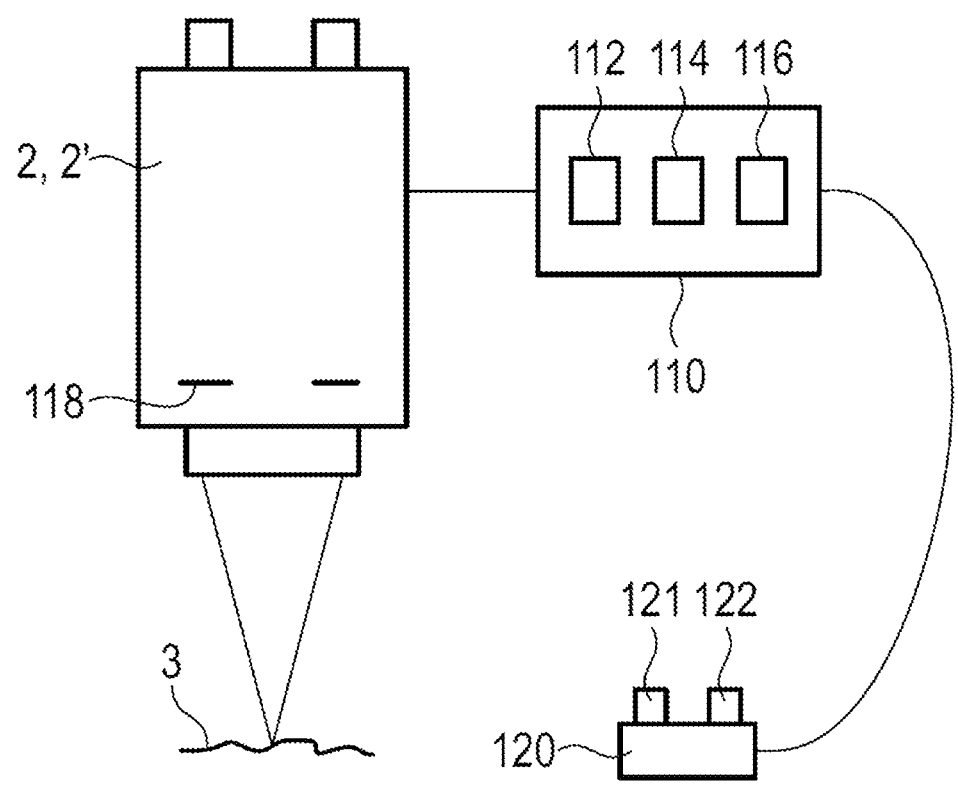

FIG. 6 shows highly schematically those components of a control device of the surgical microscope which are used for adjusting the total magnification.

On the basis of one exemplary embodiment of a hybrid surgical microscope, the basic set-up of a hybrid surgical microscope 2 and the possibility of an optical magnification are described below with reference to FIGS. 1 and 2. On the basis of one exemplary embodiment of a digital surgical microscope, the basic set-up of a digital surgical microscope 2' is then explained with reference to FIG. 3, before the procedure during a digital magnification is explained with reference to FIG. 4. Finally, the method according to the invention and the control device according to the invention are explained with reference to FIGS. 5 and 6.

Figure 1:
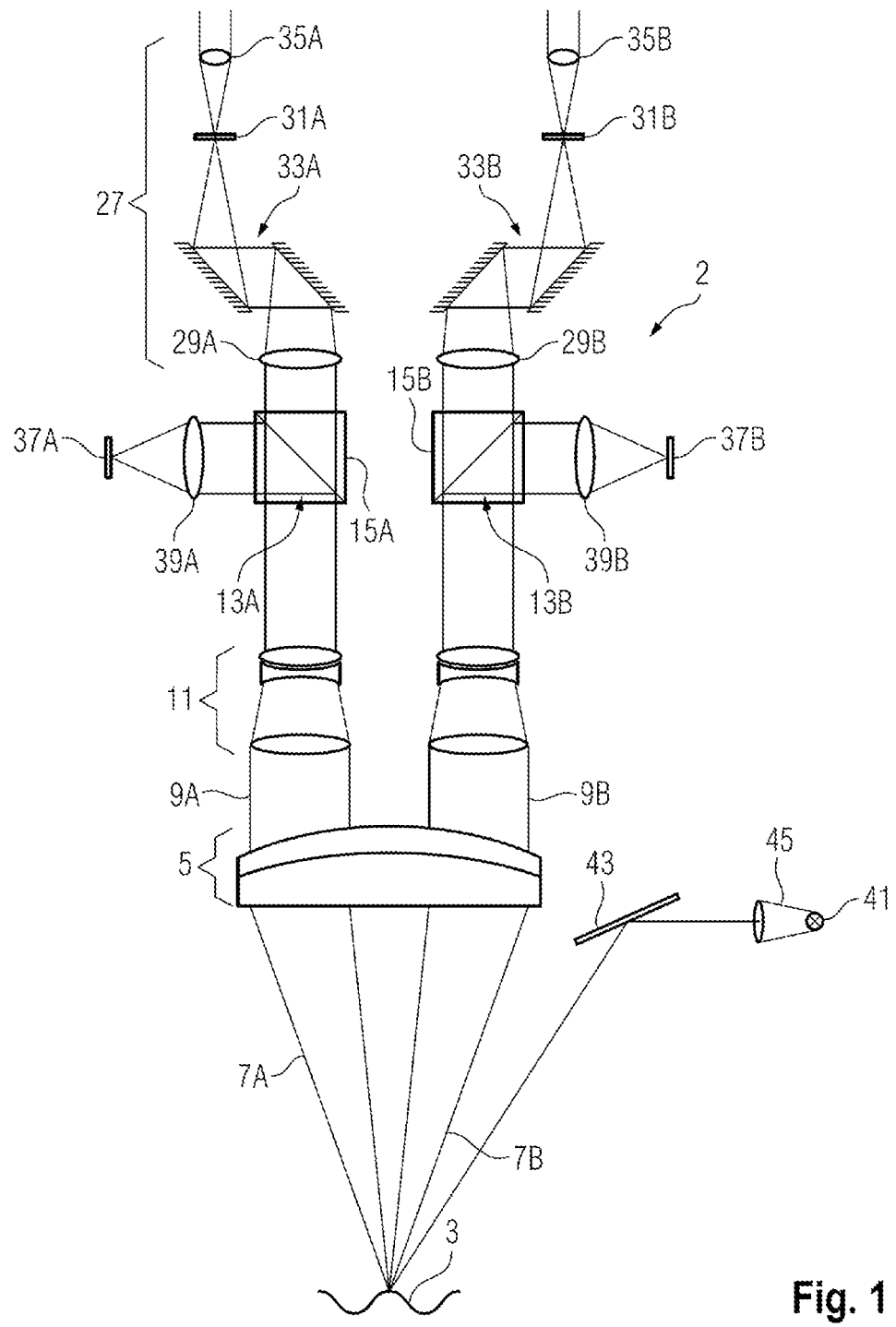
FIG. 1 shows one example of a hybrid surgical microscope in a schematic representation.

The exemplary embodiment of a hybrid surgical microscope 2 shown in FIG. 1 comprises, as essential constituent parts, an objective 5 that is intended to face an object field 3, said objective, in particular, being able to be embodied as an achromatic or apochromatic objective. In the exemplary embodiment shown, the objective 5 consists of two partial lenses that are cemented to one another and form an achromatic objective. The object field 3 is arranged in the focal plane of the objective 5 such that it is imaged at infinity by the objective 5. Expressed differently, a divergent beam 7 emanating from the object field 3 is converted into a parallel beam 9 during its passage through the objective 5.

A magnification changer 11 is arranged on the observer side of the objective 5, which magnification changer can be embodied either as a zoom system for changing the magnification factor in a continuously variable manner as in the exemplary embodiment illustrated, or, in a departure from the exemplary embodiment shown, as a so-called Galilean changer for changing the magnification factor in a stepwise manner. In the present exemplary embodiment, the zoom system is constructed from a lens combination having three lenses, the two object-side lenses being able to be displaced in order to vary the magnification factor. In actual fact, however, the zoom system can also have more than three lenses, for example four or more lenses, in which case besides the outermost lens on the observer side, the outermost lens on the object side can then also be arranged in a fixed manner. In a Galilean changer, by contrast, there are a plurality of fixed lens combinations which represent different magnification factors and which can be introduced optionally into the beam path. Both a zoom system and a Galilean changer convert an object-side parallel beam into an observer-side parallel beam with a different beam diameter. In the present exemplary embodiment, the magnification changer 11 is already part of the binocular beam path of the surgical microscope 1, i.e. it has a respective dedicated lens combination for each stereoscopic partial beam path 9A, 9B of the surgical microscope 1. Alternatively, the lenses of the magnification changer can also be of sufficient size that both stereoscopic partial beam paths 9A, 9B pass through them. In the exemplary embodiment illustrated, a magnification factor can be adjusted by means of the magnification changer 11 by way of a motor-driven actuator (not shown) which, together with the magnification changer 11, is part of a magnification changing unit for adjusting the magnification factor.

On the observer side, the magnification changer 11 is followed by an interface arrangement comprising a respective beam splitter prism 15A, 15B for each stereoscopic partial beam path 9A, 9B in the exemplary embodiment illustrated. However, in principle, use may also be made of other types of beam splitters, for example partly transmissive mirrors. In the exemplary embodiment shown, the interfaces 13A, 13B serve to output couple a beam from the beam path of the surgical microscope 2 in the direction of digital image sensors 37A, 37B. CCD sensors or CMOS sensors can be used as digital image sensors. By means of the digital image sensors 37A, 37B, a digital image of the object field 3 will be recorded in each stereoscopic partial beam path. The stereoscopic partial images recorded by the digital image sensors 37A, 37B can be output to a display or to displays of a digital examination or of smartglasses, with the aid of which a viewer can view a stereoscopic image of the object field 3. The digital examination will be explained later on the basis of the digital surgical microscope. As an alternative to the digital examination and the smartglasses, the digital stereoscopic partial images can also be represented temporally sequentially on the display of a monitor, on which a viewer can then view a stereoscopic image for example with the aid of shutter glasses controlled synchronously with the stereoscopic partial images. As a further alternative, the stereoscopic representation on the display of the monitor can also be effected e.g. by means of channels that are polarized line by line in combination with passive polarization spectacles. In this case, adjacent lines of the display emit light that is polarized orthogonally with respect to one another, and the stereoscopic partial images are each represented only by every second line of the display. The polarization filters of the polarization spectacles are oriented orthogonally with respect to one another, such that only the light with one of the two polarization states—and thus only the light of one of the stereoscopic partial images—reaches each eye. Instead of the adjacent lines, in principle it is also possible for adjacent columns of the display to emit light that is polarized orthogonally with respect to one another. Moreover, circularly polarized light with an opposite direction of rotation could also be used instead of linearly polarized light.

In the hybrid surgical microscope, the interface with the beam splitter prisms 15A, 15B is followed on the observer side by a binocular tube 27. The latter has two tube objectives 29A, 29B, which focus the respective parallel beam 9A, 9B onto an intermediate image plane 31, i.e. image the object field 3 onto the respective intermediate image plane 31A, 31B. Finally, the intermediate images situated in the intermediate image planes 31A, 31B are imaged in turn at infinity by eyepiece lenses 35A, 35B, with the result that a viewer can view the intermediate image with a relaxed eye. Moreover, an increase in the distance between the two partial beams 9A, 9B is implemented in the binocular tube by means of a mirror system or by means of prisms 33A, 33B in order to adapt said distance to the interocular distance of the viewer. In addition, image erection is carried out by the mirror system or the prisms 33A, 33B.

The surgical microscope 2 is additionally equipped with an illumination device, with which the object field 3 can be illuminated with broadband illumination light. For this purpose, the illumination device in the exemplary embodiment shown has a white-light source 41, for instance a halogen incandescent lamp, a gas discharge lamp, a white-light LED, etc. The light emanating from the white-light source 41 is directed in the direction of the object field 3 via a deflection mirror 43 or a deflection prism in order to illuminate said field. Furthermore, an illumination optical unit 45 is present in the illumination device, said illumination optical unit ensuring uniform illumination of the entire observed object field 3.

Reference is made to the fact that the illumination beam path depicted in FIG. 1 is highly schematic and does not necessarily reproduce the actual course of the illumination beam path. In principle, the illumination beam path can be embodied as so-called oblique illumination, which comes closest to the schematic illustration in FIG. 1. In the case of such oblique illumination, the beam path extends at a relatively large angle (6° or more) with respect to the optical axis of the objective 5 and, as illustrated in FIG. 1, can extend completely outside the objective 5. Alternatively, however, there is also the possibility of allowing the illumination beam path of the oblique illumination to extend through a marginal region of the objective 5. A further possibility for the arrangement of the illumination beam path is so-called 0° illumination, in which the illumination beam path extends through the objective 5 and is input coupled into the objective between the two partial beam paths 9A, 9B, along the optical axis of the objective 5 in the direction of the object field 3. Finally, there is also the possibility of embodying the illumination beam path as so-called coaxial illumination, in which a first illumination partial beam path and a second illumination partial beam path are present. The illumination partial beam paths are input coupled into the surgical microscope 2 in a manner parallel to the optical axes of the observation partial beam paths 9A, 9B by way of one or more beam splitters, with the result that the illumination partial beam paths extend coaxially in relation to the two observation partial beam paths.

The illumination can typically be influenced. By way of example, a filter can be introduced into the illumination beam path, said filter transmitting only a narrow spectral range from the broad spectrum of the white-light source 41, e.g., a spectral range that enables the excitation of fluorescence of a fluorescent dye situated in the object field 3. In order to observe the fluorescence, filters can be introduced into the observation partial beam paths, said filters filtering out the spectral range used to excite the fluorescence so that the fluorescence can be observed. The illumination device can additionally be equipped with a unit for changing the illumination light source.

In the exemplary embodiment variant of the surgical microscope 2 shown in FIG. 1, the objective 5 consists just of one achromatic lens or one apochromatic lens with a fixed front focal distance, i.e. with a fixed distance between the object-side focal plane and the vertex of the first object-side lens surface of the objective 5. Since the front focal distance determines the working distance between the surgical microscope and the object field 3, the working distance given a fixed back focus is set to this. However, the objective 5 can also use an objective lens system comprising a plurality of lenses, which enables the front focal distance and thus the working distance of the surgical microscope 2 to be varied. The object field 3 arranged in the focal plane is imaged at infinity by such an objective lens system, too, and so a parallel beam is present on the observer side.

Figure 2:
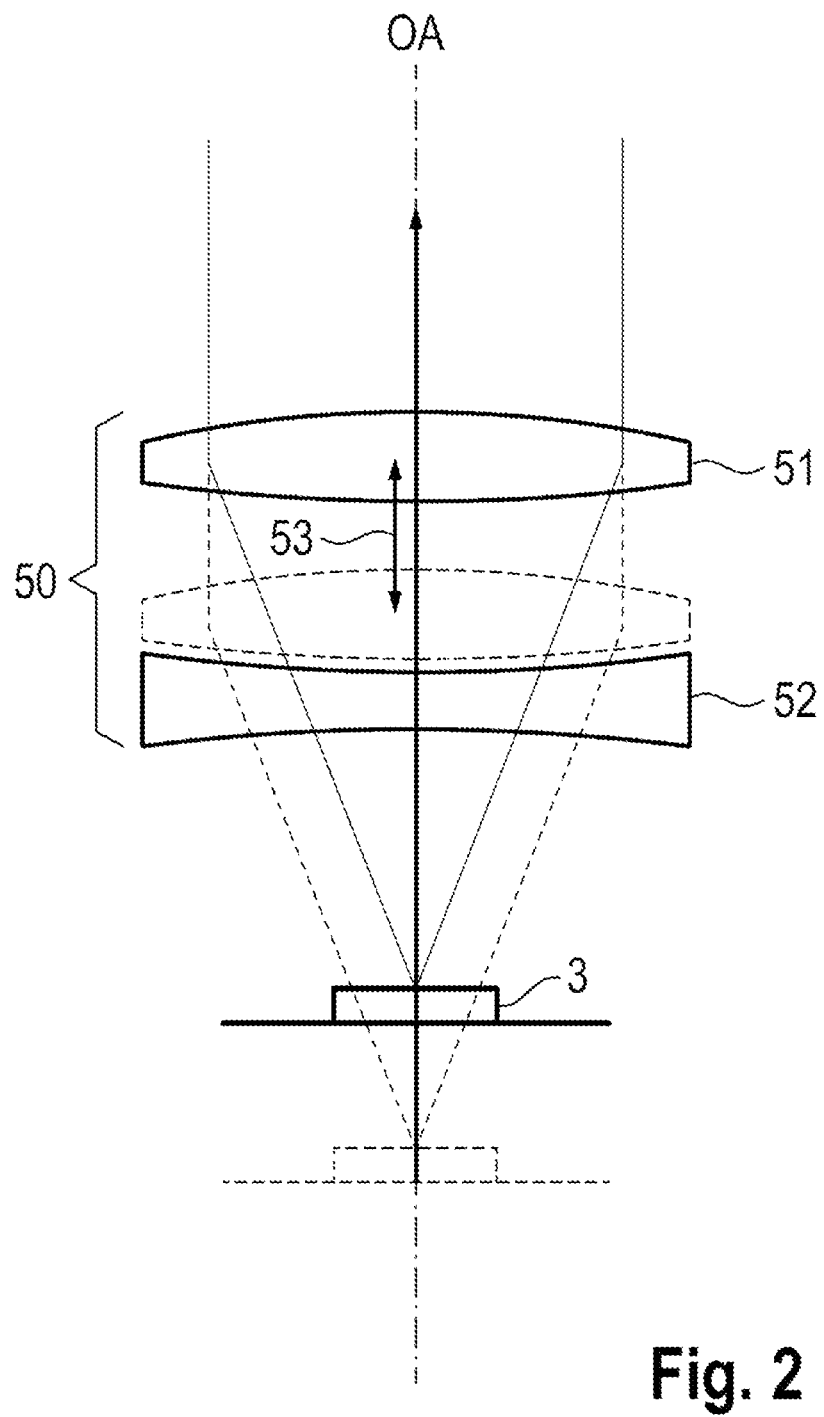
FIG. 2 shows an objective having a variable front focal distance.

One exemplary embodiment of an objective lens system 50 which enables the front focal distance to be varied is illustrated schematically in FIG. 2. This objective lens system 50 comprises a positive member 51, i.e. an optical element with positive refractive power, illustrated schematically as a convex lens in FIG. 2. Moreover, it comprises a negative member 52, i.e. an optical element with negative refractive power, illustrated schematically as a concave lens in FIG. 2. The negative member 52 is situated between the positive member 51 and the object field 3. In the objective lens system 50 illustrated, the negative member 52 has a fixed arrangement, whereas, as indicated by the double-headed arrow 53, the positive member 51 is arranged to be displaceable along the optical axis OA. When the positive member 51 is displaced into the position illustrated by dashed lines in FIG. 2, the back focal length increases, and so there is a change in the working distance of the surgical microscope 2 from the object field 3.

Even though the positive member 51 has a displaceable configuration in FIG. 2, it is also possible, in principle, to arrange the negative member 52 to be movable along the optical axis OA instead of the positive member 51. However, the negative member 52 often forms the last lens of the objective lens system 50. A stationary negative member 52 therefore offers the advantage of making it easier to seal the interior of the surgical microscope 2 from external influences. Furthermore, it is noted that even though the positive member 51 and the negative member 52 in FIG. 2 are only illustrated as individual lenses, each of these members can also be realized in the form of a lens group or a cemented element instead of in the form of an individual lens, for example to embody the objective lens system 50 to be achromatic or apochromatic.

Figure 3:
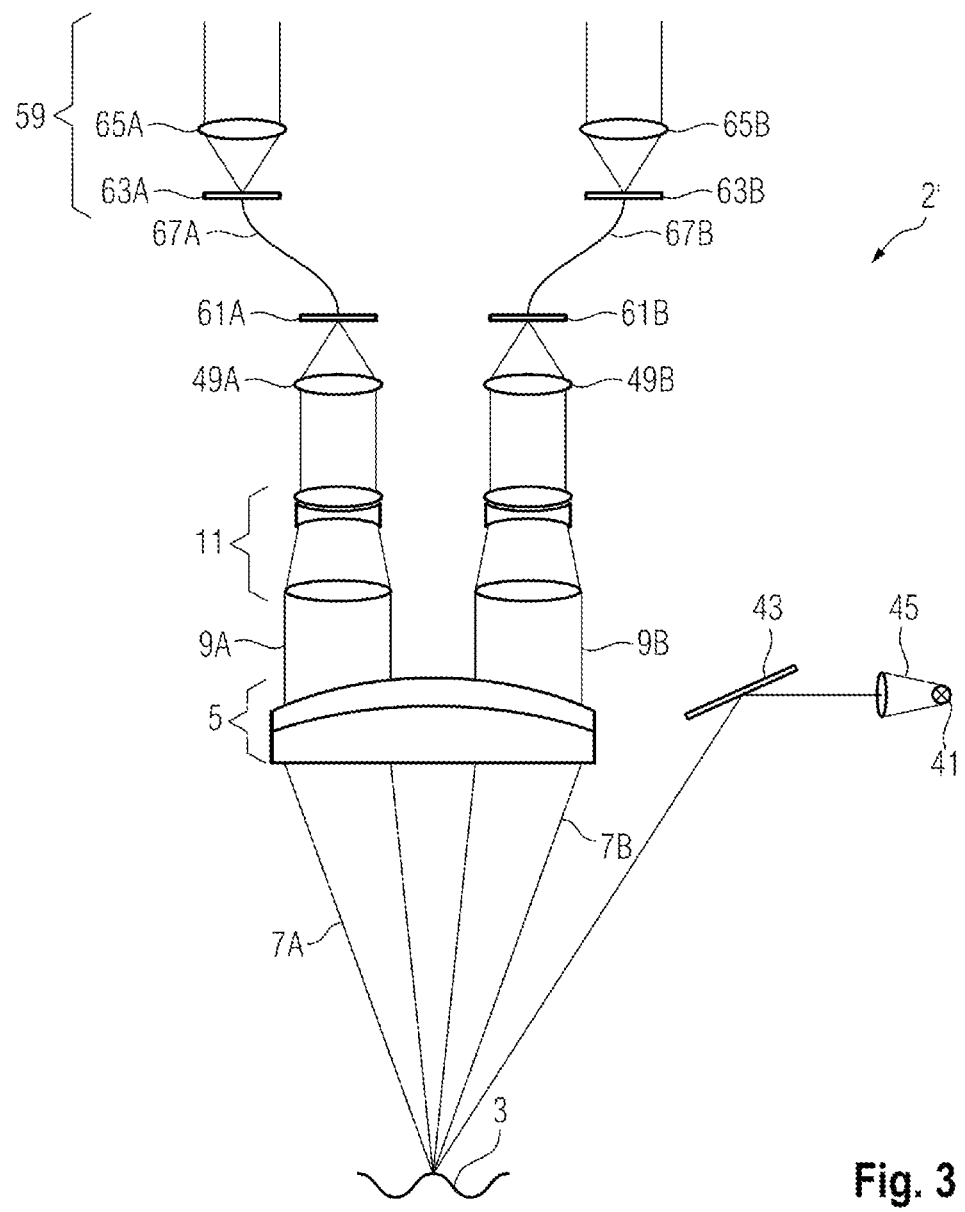
FIG. 3 shows one example of a purely digital surgical microscope in a schematic representation.

FIG. 3 shows one exemplary embodiment of a digital surgical microscope 2' in a schematic representation. In this surgical microscope 2', the main objective 5, the magnification changer 11, and the illumination system 41, 43, 45 do not differ from the hybrid surgical microscope 2 illustrated in FIG. 1. The difference between the surgical microscope 2' illustrated in FIG. 3 and the surgical microscope 2 illustrated in FIG. 1 is that the surgical microscope 2' shown in FIG. 3 does not comprise a binocular tube 27. Instead, focusing lenses 49A, 49B are arranged on the observer side of the magnification changer 11, and focus the stereoscopic partial beam paths onto digital image sensors 61A, 61B. The object field 3 is thereby imaged onto the digital image sensors 61A, 61B, each of which generates a digital stereoscopic partial image. In this case, the digital image sensors 61A, 61B can be CCD sensors or CMOS sensors, for example.

In the exemplary embodiment illustrated in FIG. 3, a digital examination 59 is present for the purpose of viewing the digital stereoscopic partial images recorded by the digital image sensors 61A, 61B, and has a digital display 63A, 63B for each stereoscopic partial beam path, the respective digital stereoscopic partial image being represented on said display. In this case, the digital displays 63A, 63B can be designed for example as LED displays, as LCD displays or as displays based on organic light-emitting diodes (OLEDs). For the purpose of viewing the digital partial images represented on the digital displays 63A, 63B, the digital examination 59, like the binocular tube 27, has eyepiece lenses 65A, 65B, which image the stereoscopic partial image represented on the respective digital display 63A, 63B at infinity, with the result that a viewer can view said partial image with a relaxed eye. In this case, the digital partial images recorded by the digital image sensors 61A, 61B can be forwarded by means of cables 67A, 67B or wirelessly to the digital displays 63A, 63B of the digital examination. Instead of being part of a digital examination, the displays 63A, 63B and the eyepiece lenses 65A, 65B can also be part of a head mounted display (HMD) such as smartglasses, for instance. Furthermore, there is the possibility of representing the recorded digital stereoscopic partial images on a large monitor that is viewed by the user with suitable 3D glasses. For the purpose of differentiating the stereoscopic partial images, the latter during the representation of the stereoscopic images on the monitor can be represented e.g. with different polarizations of the light emitted by the monitor. The 3D glasses then contain switchable polarizers that are switched synchronously with the representation of the partial images on the monitor. However, it is also possible to effect a purely temporally sequential representation of the digital stereoscopic partial images, which is viewed with synchronized shutter glasses, as has been described with reference to the hybrid surgical microscope 2. It goes without saying that it is also possible, in the case of the hybrid surgical microscope 2, to represent the digital stereoscopic partial images on the monitor with different polarizations and to view them with 3D glasses containing switchable polarizers.

Even though FIG. 3, like FIG. 1, illustrates just one achromatic lens 5 with a fixed focal length, the surgical microscope 2' shown in FIG. 3, like the surgical microscope 2 illustrated in FIG. 1, can comprise an objective lens system 50 instead of the objective lens 5, said objective lens system enabling the front focal distance to be varied.

FIG. 4 schematically shows the procedure during a digital magnification of an image segment 102 of a digital image 100 with an image content 104 by means of a digital zoom system. For the purpose of digital magnification, the image segment 102 of the digital image 100 is upscaled to the nominal image resolution of the entire digital image 100 in order to obtain an upscaled, i.e. digitally magnified image 103, in which case additional image points (pixels) have to be supplemented since the image segment 102 comprises fewer image points than the entire digital image 100. In the simplest case, the supplementation can be effected by image points that include the same image point value (pixel value) as a specific image point of the image segment 102 being supplemented adjacent to the specific image point of the image segment 102. If the side lengths of the image segment 102 correspond to half of the side lengths of the entire digital image 100, for example, the area of the image segment 102 corresponds to one quarter of the area of the entire digital image 100. Therefore, for each image point of the image segment 102, the image segment upscaled to the nominal image resolution of the original digital image 100 must contain four image points, each of which then has the same value as the image point of the image segment 102. As a result, however, the actual image resolution is reduced in the digitally magnified image 103. If the actual image resolution in the original digital image 100 corresponded to the nominal image resolution, for example, then in the digitally magnified image 103 it corresponds only to one quarter of the nominal image resolution. This is unproblematic as long as the viewer of the digitally magnified image 103 cannot perceive this actual loss of resolution. Whether the viewer can perceive the loss of resolution depends here primarily on the area which those image points of the digitally magnified image 103 which represent the value of the original image point of the image segment 102 occupy on the display that represents the digitally magnified image 103, and also on the provided distance between the viewer and this display. Since conventional image sensors and conventional displays of monitors nowadays often have a 4K resolution, an image segment 102 can be upscaled to a certain limit, without a viewer of the digitally magnified image 103 perceiving a loss of resolution.

Instead of the upscaling of the image segment 102 involving image points with the same image point value simply being supplemented adjacent to a specific image point of the image segment 102, there is also the possibility of performing an interpolation on the basis of a number of adjacent image points in the image segment 102 in order to obtain an interpolated profile of the image point values of the individual pixels. This interpolated profile is generally a continuous function of the image point values dependent on the location within the image segment, which can be used to derive intermediate values of the image point values for the area of a single image point of the image segment 102. During upscaling, the intermediate values of the image point values can then be obtained for the added image points. What can be achieved as a result is that a perceptible loss of resolution in the digitally magnified image 103 occurs later than when adjacent image points with the same image point value are supplemented.

Moreover, there is the possibility of the image sensor used or the image sensors used having a higher number of available pixels and thus a higher resolution than the display used or the displays used. In this case, with the digital magnification, the digital image, without the need for additional pixels to be inserted, can be digitally magnified until the number of pixels of the image sensor which record the corresponding image segment corresponds to the number of available pixels of the display. For example, if the image sensor used has a resolution of 4096×2160 pixels (4K-DCI), i.e. 4096×2160 pixels are available, but the display only has a resolution of 2048×1080 pixels (Full HD+), i.e. only 2048×1080 pixels are available, then on the display e.g. only every second line of the image recorded by the image sensor is represented, and also only every second pixel from each represented line if all available pixels are used at the image sensor for the image recording. In total, therefore, only the image information of one quarter of the pixels available at the image sensor is represented on the display. If a digital magnification with a magnification factor of 2.0 then takes place, the edge lengths of the image segment representing the digitally magnified image correspond to half of the original digital image. As a result, the area of the magnified image segment corresponds to only one quarter of the original image and thus one quarter of the sensor area, i.e. a sensor area with a resolution of 2048×1080 pixels. In the case of a digital magnification with a digital magnification factor of 2.0, the number of pixels of the image sensor used for the recording of the digitally magnified image thus corresponds to the available number of pixels of the display, and so the digitally magnified image can be represented on the display without the need for additional pixels to be inserted. As a result, the resolution attained with the image sensor can be represented on the display without any loss. Therefore, in this example, up to a digital magnification with a magnification factor of 2.0, a user perceives no subjective loss of resolution when viewing the magnified image on the display. It is therefore advantageous if the image sensor used or the image sensors used has or have a higher number of pixels and thus a higher resolution than the display used or the displays used.

An advantageous situation is also afforded if the display has a number of pixels similar in magnitude to that of the image sensor used, but uses only some of these pixels to represent an image. By way of example, representing stereoscopic images often involves the use of a polarization method with passive polarization spectacles, in which only every second line (or in other configurations only every second column) of the display is used for the representation of a stereoscopic partial image. Only half of the pixels would be used as a result. It is often the case here, moreover, that as well only every second pixel in each line is used in order to keep the ratio of lines to columns constant, and so only one quarter of the pixels are used as a result. If e.g. image sensor and display then each have 4096×2160 pixels (4K-DCI), only 2048×1080 pixels would be used for the representation of a stereoscopic partial image. If a digital magnification with a magnification factor of 2.0 then takes place, the edge lengths of the image segment representing the digitally magnified image correspond to half of the original digital image. As a result, the area of the magnified image segment corresponds to only one quarter of the original image and thus one quarter of the sensor area, i.e. a sensor area with a resolution of 2048×1080 pixels. In the case of a digital magnification with a magnification factor of 2.0, the number of pixels of the image sensor that are used for the recording of the digitally magnified image thus corresponds to the number of pixels used by the display. The digitally magnified image can thus be represented on the display without the need for additional pixels to be inserted, and so a loss of resolution noticeable to the user can be avoided. If the ratio of lines to columns is not kept constant and all pixels are used in each line, it would indeed be necessary for additional pixels to be added within the lines by means of interpolation, for example, and so a loss of resolution would occur in the line direction, but then at least perpendicular to the line direction there would still be no loss of resolution noticeable to the user. If in addition the image sensor has more pixels than the display (e.g. 8192×4320, 8K-DCI), the magnification factor of the digital magnification can be increased further without the need for additional pixels to be inserted for the representation on the display. As a result, the resolution attained with the image sensor can be represented on the display without loss of resolution, even in the case of high digital magnification.

In addition to the possibility of performing a digital magnification, hybrid or digital optical observation apparatuses such as the hybrid surgical microscope described or the digital surgical microscope described generally also afford the possibility of providing an optical magnification with the aid of magnification changers such as a Galilean changer or an optical zoom. In such a system which provides both a digital magnification and an optical magnification, the total magnification of the system results from the combination of the optical magnification with the digital magnification. In this case, the magnification factor of the total magnification can be ascertained by multiplying the magnification factor of the optical magnification by the magnification factor of the digital magnification. In the context of the method according to the invention described below, the fact that an image segment 102 can be upscaled to a certain limit without a viewer of the upscaled digital image 103 perceiving a loss of resolution is utilized when changing the total magnification of a hybrid or digital optical observation apparatus.

FIG. 5 shows the magnification range of the total magnification GV of a surgical microscope such as the surgical microscope 2 or the surgical microscope 2', for example, in a schematic representation. In the present exemplary embodiment, the magnification range of the total magnification GV extends from a magnification factor of 0.4 up to a magnification factor of 7.2. In this case, the total magnification GV is provided by the combination of an optical magnification OV and a digital magnification DV. In the present exemplary embodiment, the optical magnification OV is provided by an optical zoom system which makes possible magnification factors in the range of 0.4 to 2.4, which can be adjusted in a continuously variable manner. However, the range in which the optical zoom system provides magnification factors can also be smaller or larger than the range of 0.4 to 2.4, e.g. 1.0 to 2.0 or 0.1 to 3.0, and/or it can be shifted relative to the range of 0.4 to 2.4, e.g. 0.5 to 2.5. In addition, it is also possible to provide a Galilean changer instead of an optical zoom system, the Galilean changer providing different fixed magnification factors. The digital magnification DV is provided by a digital zoom system such as has been described above, which provides magnification factors in a range of 1.0 to 3.0, which can be adjusted in a continuously variable manner. The range in which the digital zoom system provides magnification factors can also be smaller or larger than the range of 1.0 to 3.0, e.g. 1.0 to 2.5 or 1.0 to 3.5, and/or it can be shifted relative to the range of 1.0 to 3.0, e.g. 1.5 to 2.5. Typically, however, the lower limit of the range of the magnification factors of the digital zoom system will be at a magnification factor of 1.0, in order that the digital magnification DV can tie in with the optical magnification OV without a sudden change in magnification. In the context of the method according to the invention, the magnification range of the total magnification GV is subdivided into 3 portions I to III, in which the total magnification GV is provided in different ways. In the portion I, the optical magnification OV in the present exemplary embodiment is kept constant at the lowest value, such that this optical magnification provides a magnification factor of 0.4 in the entire portion I. In order to change the total magnification GV, exclusively the digital magnification DV is therefore changed in the portion I. In the present exemplary embodiment, the digital magnification DV provides magnification factors of between 1.0 and 2.0 in the portion I, the magnification factor being able to be adjusted in steps of 0.1. Alternatively, however, a quasi-continuous adjustment of the magnification factor is also possible, i.e. an adjustment in which the smallest possible change in the magnification factor is given by the size of the pixels of the image sensor used or the image sensors used. The upper limit of the portion I is formed by the total magnification GV with a magnification factor of 0.8, resulting from the multiplication of the magnification factor of 0.4 of the optical magnification OV by the magnification factor of 2.0 of the digital magnification DV. In the exemplary embodiment described, the magnification factor of 2.0 is determined here by that magnification factor of the digital magnification DV which just about does not lead to a perceptible loss of resolution when viewing the magnified image 103. Depending on the optics used, the polarization method used (e.g. line-by-line coding), the display used, the image sensor used, and the provided distance between the user and the display, that magnification factor of the digital magnification DV which just about does not lead to a perceptible loss of resolution when viewing the magnified image 103 can have a different value than 2.0.

By virtue of the fact that in the portion I the optical magnification OV is kept constant at the minimum magnification factor of 0.4, in the entire portion I when changing the total magnification GV the maximum depth of field of the image is also maintained in the image 103 magnified with the total magnification GV. By contrast, if the magnification factor of the optical magnification OV were increased instead of the magnification factor of the digital magnification DV in order to obtain the same total magnification GV in the magnified image 103, this would lead to a reduction of the depth of field in the magnified image 103.

In contrast to portion I, in the present exemplary embodiment in portion II a change in the total magnification GV is brought about exclusively by changing the optical magnification OV, the optical magnification OV being able to be varied in a continuously variable manner between the magnification factor of 0.4 and a magnification factor of 2.4 in the portion II. By contrast, the digital magnification DV is kept constant at the magnification factor of 2.0 in the portion II, and so it is possible to avoid a perceptible loss of resolution over the entire portion II. Optical magnification generally does not lead to a loss of resolution.

In the exemplary embodiment, a possible loss of depth of field that occurs in portion II can be compensated for with the aid of a stop 118 with an adjustable aperture (see FIG. 6), which serves as a component for depth of field adjustment, by the diameter of the aperture being reduced. Although the reduction of the diameter of the aperture has the effect that the optical resolution of the surgical microscope decreases, it holds true here, too, that this is innocuous as long as the decrease in the optical resolution is not perceived as disturbing by the user. For the case where reducing the diameter of the aperture leads to a perceptible decrease in the optical resolution, the user of the surgical microscope can adjust the diameter of the aperture so that there is a depth of field acceptable to the user in conjunction with a resolution that is still acceptable to the user.

In the present exemplary embodiment, the magnification factor of the optical magnification of 2.4 is the largest magnification factor provided by the optical magnification OV, and so in the portion II the entire optical magnification range is used for adjusting the total magnification GV.

In the present exemplary embodiment, the upper limit of the portion II is defined by the maximum magnification factor of the optical magnification OV, i.e. the maximum magnification achievable with the optical zoom, in conjunction with the magnification factor of the digital magnification of 2.0. In the present exemplary embodiment, a total magnification GV with a magnification factor of 4.8 thus results as the upper limit of the portion II. With a magnification factor of the optical magnification OV of 0.4 and a magnification factor of the digital magnification DV of 2.0—and thus a magnification factor of the total magnification GV of 0.8—the lower limit of the total magnification GV of the portion II corresponds to the upper limit of the total magnification GV of the portion I, such that the total magnification GV in the portion II follows the total magnification GV in the portion I in a continuously variable manner, i.e. without a sudden change in the total magnification GV.

In the portion III, a change in the total magnification GV is once again brought about exclusively by way of a change in the digital magnification DV, the magnification factor of the optical magnification OV being kept constant at the maximum value, i.e. at the value of 2.4 in the current exemplary embodiment, the magnification factor of the digital magnification being able to be adjusted in steps of 0.1 as in the portion I. Alternatively, a quasi-continuous adjustment of the magnification factor is once again possible as well. In portion III, a further increase in the total magnification GV is bought at the expense of a perceptible loss of resolution. In the portions I and II, by contrast, no perceptible loss of resolution occurs, and in portion I, in particular, there is additionally a higher depth of field than if the optical zoom system were used for changing the total magnification GV.

In the present exemplary embodiment, the upper limit of the portion III is defined by the maximum magnification factor of the optical magnification OV, i.e. the maximum magnification achievable with the optical zoom, and the maximum magnification factor of the digital magnification DV. In the present exemplary embodiment, a total magnification GV with a magnification factor of 7.2 thus results as the upper limit of the portion III. With a magnification factor of the optical magnification OV of 2.4 and a magnification factor of the digital magnification DV of 2.0—and thus a magnification factor of the total magnification GV of 4.8— the lower limit of the total magnification GV of the portion III corresponds to the upper limit of the total magnification GV of the portion II, such that the total magnification GV in the portion III follows the total magnification GV in the portion II in a continuously variable manner, i.e. without a sudden change in the total magnification GV. Overall, the total magnification can thus be varied in a continuously variable manner, i.e. without a sudden change in the magnification factor of the total magnification, from the minimum possible magnification factor of the total magnification of 0.4 up to the maximum possible magnification factor of the total magnification of 7.2. A user of a hybrid or digital surgical microscope in which the described procedure when changing the total magnification GV is realized can thus adjust the total magnification GV intuitively in the manner familiar to the user from surgical microscopes in which the total magnification GV is provided solely with the aid of an optical magnification OV.

For the purpose of carrying out the method described, the surgical microscope 2, 2' in one exemplary embodiment has a control device 110, which can act firstly on the optical zoom system 11 or the Galilean changer and secondly on the digital zoom system. A surgical microscope 2, 2' having a control device 110 of this type is illustrated highly schematically in FIG. 6. This control device 110 comprises a divider 112, which divides the magnification range of the total magnification GV into the portions I to III in the present exemplary embodiment, and a magnification controller 114, which, depending on the respective portion, either keeps the optical magnification OV constant and changes the digital magnification DV or keeps the digital magnification DV constant and changes the optical magnification OV. In addition, the control device 110 can have, as depth of field controller, a stop controller 116, which, in particular in the portion II of the magnification range of the total magnification GV, controls the aperture diameter of a stop 118 with an adjustable aperture depending on the magnification factor adjusted at the optical zoom system 11 or optionally depending on the magnification factor adjusted at the Galilean changer, in order to increase the depth of field by reducing the aperture diameter of the stop during an increase of the magnification factor of the optical magnification. Optionally, in the portion III, too, the aperture of the stop can be adjusted to an aperture diameter which leads to a sufficient depth of field for the maximum magnification factor of the optical zoom system or of the Galilean changer. In principle, it is furthermore possible in the portion I, too, to increase the depth of field by reducing the diameter of the aperture.

The control device 110 can additionally have an input interface, for instance a keyboard, a touch screen, a voice input unit, etc., via which a user can individually specify the limits of the portions I-III. The input interface can additionally enable the user to adjust the aperture diameter of the stop 118 manually, so that the depth of field can be adapted to the user's respective preferences.

In the present exemplary embodiment, the control device 110 is assigned a foot control panel 120 as operating element. The foot control panel 120 is equipped with two foot buttons 121, 122, the actuation of the foot button 121 reducing the total magnification GV adjusted at the surgical microscope 2, 2' for as long as the foot button 121 is pressed, or until the minimum total magnification GV is reached. By contrast, actuating the foot button 122 increases the adjusted total magnification GV for as long as the foot button 122 is pressed, or until the maximum total magnification GV is reached. A user can thus adjust the total magnification intuitively without having to think about whether they ought to adjust the digital magnification DV or the optical magnification OV. The user also does not need firstly to input values for the desired depth of field and the desired magnification, as is the case in the method described in JP 2013007849 A.

Instead of two foot buttons 121, 122, the foot control panel 120 can also be equipped with a pedal, the pedal position of which represents a specific total magnification. By way of example, a more deeply depressed pedal can represent a higher total magnification and a less deeply depressed pedal can represent a lower total magnification. A person skilled in the art additionally recognizes that the operating element need not necessarily be configured as a foot control panel. Instead of the foot buttons 121, 122, hand-actuated buttons that perform the same function as the foot buttons 121, 122 can be present on the surgical microscope 2, 2'. A hand-actuated lever, a hand-actuated sliding controller or a hand-actuated rotary controller can likewise be present, the position of the lever or of the controller representing a specific total magnification. The buttons, the sliding controller or the rotary controller also need not be physical buttons or controllers. Buttons, sliding controllers or rotary controllers on a touchscreen can likewise perform the function of the physical buttons or controllers.

The present invention has been described in detail on the basis of exemplary embodiments for explanatory purposes. However, a person skilled in the art recognizes that it is possible to depart from these exemplary embodiments. In this regard, for example, the magnification factor of the optical magnification OV in the portion I need not necessarily be kept completely constant, but rather can be varied over a small range as long as the majority, i.e. at least 65%, in particular at least 75%, preferably at least 90% and ideally 100%, of the total magnification is determined by the digital magnification DV. Moreover, the optical magnification OV, if it is kept constant in the portion I, need not necessarily be kept constant at the lowest magnification factor. Rather, it could also be kept constant at a different magnification factor, for example at a magnification factor of 0.5, a magnification factor of 0.6 or a magnification factor of 1.0. All that is important in this connection is that enough latitude remains in order to be able to bring about, in the portion II, a majority, i.e. at least 65%, in particular at least 75%, preferably at least 90% and ideally 100%, of an increase in the total magnification GV on the basis of a change in the magnification factor of the optical magnification OV. Likewise, the magnification factor of the digital magnification DV in the portion II need not necessarily be kept completely constant. It holds true here, too, that said magnification factor can be varied over a small range as long as the majority, i.e. at least 65%, in particular at least 75%, preferably at least 90% and ideally 100%, of the total magnification GV in the portion II is determined by the optical magnification OV. Moreover, the optical magnification in the portion II need not be fully exhausted. In order to maintain enough depth of field, for example, the total magnification in the portion II can be increased only up to a magnification factor that is smaller than the maximum magnification factor of the optical magnification OV. In addition, the magnification range of the total magnification GV can also be divided into more than three portions. By way of example, in the portion II, only part of the optical magnification OV could be utilized, for instance the part with a magnification factor of 0.4 to 1.5. In portion III, with the magnification factor of the optical magnification of 1.5, the total magnification GV could then be increased further on the basis of the digital magnification DV before, in a further portion IV, the optical magnification OV in conjunction with a largely constant digital magnification DV is finally increased up to the maximum optical magnification. Therefore, any desired number of portions can be present, the total magnification GV in the portions being adjusted alternately in each case substantially by way of the digital magnification DV and substantially by way of the optical magnification OV. On the other hand, the method can also be carried out with just two portions if the maximum digital magnification DV does not yet lead to a perceptible loss of resolution in the magnified image 103. In this case, the entire magnification range available for the digital magnification DV can be exhausted in the portion I. In portion II, the entire range available for the optical magnification OV would then be exhausted in conjunction with a constant maximum digital magnification DV. Since the highest digital magnifications generally lead to a loss of resolution, however, the division of the magnification range of the total magnification GV into at least three portions is advantageous in most cases. Since a person skilled in the art recognizes that it is possible to depart from the exemplary embodiments, the present invention shall not be restricted by the exemplary embodiments described, but rather only by the appended claims.

The invention claimed is:

1. A method for changing a total magnification of the representation of an observation object imaged with the aid of an optical observation apparatus, the optical observation apparatus comprising an imaging optical unit for generating at least one optical image of the observation object, at least one optical magnification changer for providing an optical magnification of the at least one optical image, at least one digital image sensor for recording at least one digital image of the at least one optical image, at least one digital zoom system for providing a digital magnification of the at least one digital image, and an adjustable magnification range for the total magnification, and the total magnification of the optical observation apparatus being given by the optical magnification and the digital magnification, in which method at least the optical magnification of the at least one optical image or at least the digital magnification of the at least one digital image is changed for the purpose of changing the total magnification, where the magnification range for the total magnification is divided into at least a first portion and a second portion, following the first portion of the magnification range, where the lower limit of the total magnification of the second portion of the magnification range corresponds to the upper limit of the total magnification of the first portion of the magnification range, and in the first portion of the magnification range, comprising the lowest total magnifications, at least 65% of the change in the total magnification up to the upper limit of the total magnification of the first portion of the magnification range is brought about by adjusting the digital magnification, and in the second portion of the magnification range, at least 65% of a change in the total magnification is brought about by adjusting the optical magnification, wherein the upper limit of the total magnification of the first portion of the magnification range is defined by that digital magnification which, together with the optical magnification employed in the first portion of the magnification range, leads to a total magnification for which a user with an average eye just about perceives no noticeable subjective loss of resolution when viewing the magnified image.

2. The method as claimed in claim 1, wherein the change in the total magnification in the first portion of the magnification range is brought about exclusively by adjusting the digital magnification.

3. The method as claimed in claim 2, wherein in the first portion of the magnification range, the optical magnification is kept constant at a low value.

4. The method as claimed in claim 1, wherein an upper limit of the total magnification of the second portion of the magnification range is defined by the highest optical magnification and the digital magnification present at the upper limit of the total magnification of the first portion of the magnification range.

5. The method as claimed in claim 1, wherein
an image recorded by the at least one digital image sensor is represented by means of at least one display, only some of the pixels present on the display being used on the at least one display for the purpose of representing an image recorded by the at least one digital image sensor, and the number of pixels used on the at least one display for the purpose of representing an image recorded by the at least one digital image sensor being lower than the number of pixels present on the digital image sensor for the purpose of recording a digital image, and
the digital image is digitally magnified in the first portion of the magnification range at most to an extent such that the number of pixels of the at least one image sensor which record the image segment corresponding to the digitally magnified image falls below the number of pixels used by the display for the purpose of representing an image recorded by the at least one digital image sensor by not more than 20%.

6. The method as claimed in claim 1, wherein
an image recorded by the at least one digital image sensor is represented by means of at least one display which, for the purpose of representing an image recorded by the at least one digital image sensor, contains fewer pixels than the number of pixels available to the at least one digital image sensor for the purpose of recording the digital image, and
the digital image is digitally magnified in the first portion of the magnification range at most to an extent such that the number of pixels of the at least one image sensor which record the image segment corresponding to the digitally magnified image falls below the number of pixels of the at least one display that are present for the purpose of representing an image recorded by the at least one digital image sensor by not more than 20%.

7. The method as claimed in claim 1, wherein in the second portion of the magnification range, the digital magnification is kept constant at a medium value.

8. The method as claimed in claim 1, wherein the entire magnification range is divided into at least the first portion, the second portion and a third portion, following the second portion, and in the third portion of the magnification range, at least 65% of the change in the total magnification is brought about by adjusting the digital magnification.

9. The method as claimed in claim 8, wherein a lower limit of the total magnification of the third portion of the magnification range corresponds to the upper limit of the total magnification of the second portion of the magnification range.

10. The method as claimed in claim 8, wherein in the third portion of the magnification range, the optical magnification is kept constant at a high value.

11. The method as claimed in claim 8, wherein an upper limit of the total magnification of the third portion of the magnification range is given by the highest optical magnification and the highest digital magnification.

12. The method as claimed in claim 1, wherein the total magnification is increased or decreased continuously, quasi-continuously or in steps upon actuation of an operating element.

13. The method as claimed in claim 12, wherein the total magnification is increased or decreased across the portions of the magnification range.

14. The method as claimed in claim 1, wherein the optical observation apparatus comprises a component for depth of field adjustment and the component for depth of field adjustment is also adjusted at least in one of the portions of the magnification range.

15. A control device for an optical observation apparatus comprising an imaging optical unit for generating at least one optical image of an observation object, at least one optical magnification changer for providing an optical magnification of the at least one optical image, at least one digital image sensor for recording at least one digital image of the at least one optical image, at least one digital zoom system for providing a digital magnification of the at least one digital image, and an adjustable magnification range for the total magnification, the total magnification of the optical observation apparatus being given by the optical magnification and the digital magnification, wherein the control device comprises a divider and a magnification controller, the divider being designed to divide the magnification range for the total magnification into at least two portions, and the magnification controller being designed to carry out the method as claimed in claim 1.

16. An optical observation apparatus comprising an imaging optical unit for generating at least one optical image of the observation object, at least one optical magnification changer for providing an optical magnification of the at least one optical image, at least one digital image sensor for recording at least one digital image of the at least one optical image, at least one digital zoom system for providing a digital magnification of the at least one digital image, and an adjustable magnification range for the total magnification, the total magnification of the optical observation apparatus being given by the optical magnification and the digital magnification, wherein a control device as claimed in claim 15.

17. The optical observation apparatus as claimed in claim 16, wherein an operating element for increasing or decreasing the total magnification is present, the actuation of which causes the magnification controller to continuously increase or decrease the total magnification.

18. The optical observation apparatus as claimed in claim 16, wherein it additionally comprises a component for depth of field adjustment, the magnification control device having a depth of field controller configured also to perform an adjustment of the component for depth of field adjustment during an adjustment of the magnification at least in one of the magnification range portions.

* * * * *